(12) United States Patent
Kato et al.

(10) Patent No.: US 9,539,931 B2
(45) Date of Patent: Jan. 10, 2017

(54) AUTOMOTIVE LAMP

(71) Applicants: KOITO MANUFACTURING CO., LTD., Minato-ku, Tokyo (JP); TOYOTA JIDOSHA KABUSHIKI KAISHA, Toyota-shi, Aichi (JP)

(72) Inventors: Yasuyuki Kato, Shizuoka (JP); Yasushi Sato, Shizuoka (JP); Yuji Noritake, Toyota (JP)

(73) Assignees: KOITO MANUFACTURING CO., LTD., Minato-ku, Tokyo (JP); TOYOTA JIDOSHA KABUSHIKI KAISHA, Toyota-shi, Aichi (JP)

( * ) Notice: Subject to any disclaimer, the term of this patent is extended or adjusted under 35 U.S.C. 154(b) by 0 days.

(21) Appl. No.: 14/778,446

(22) PCT Filed: Mar. 17, 2014

(86) PCT No.: PCT/JP2014/001495
§ 371 (c)(1),
(2) Date: Sep. 18, 2015

(87) PCT Pub. No.: WO2014/148029
PCT Pub. Date: Sep. 25, 2014

(65) Prior Publication Data
US 2016/0272106 A1    Sep. 22, 2016

(30) Foreign Application Priority Data

Mar. 22, 2013  (JP) .................................. 2013-060931

(51) Int. Cl.
*B60Q 1/00*  (2006.01)
*B60Q 1/04*  (2006.01)
*F21S 8/10*  (2006.01)

(52) U.S. Cl.
CPC ........... *B60Q 1/0041* (2013.01); *B60Q 1/0011* (2013.01); *B60Q 1/04* (2013.01); *F21S 48/1266* (2013.01)

(58) Field of Classification Search
CPC ....... B60Q 1/0011; B60Q 1/0041; B60Q 1/04; F21S 48/1266
See application file for complete search history.

(56) References Cited

U.S. PATENT DOCUMENTS

| | | |
|---|---|---|
| 5,526,239 A | 6/1996 | Sato |
| 2007/0086202 A1 | 4/2007 | Tsukamoto et al. |

(Continued)

FOREIGN PATENT DOCUMENTS

| | | |
|---|---|---|
| CN | 101922667 A | 12/2010 |
| EP | 1936260 A1 | 6/2008 |

(Continued)

OTHER PUBLICATIONS

International Search Report (From PCT/ISA/210) issued on May 13, 2014, by the Japanese Patent Office in corresponding International Application No. PCT/JP2014/001495, with English Translation. (6 pages).

(Continued)

*Primary Examiner* — Thomas M Sember
(74) *Attorney, Agent, or Firm* — Buchanan Ingersoll & Rooney PC

(57) ABSTRACT

An automotive lamp according to one embodiment of the present invention includes: a first lamp unit that has a first projection lens; a second lamp unit that has a second projection lens; and an inter-lens region illumination lens that is arranged such that the inter-lens region illumination lens covers a region between the first projection lens and the second projection lens when viewed from the front of the lamp and such that the inter-lens region illumination lens (Continued)

radiates, toward the front of the lamp, light that is emitted from at least one of the first projection lens and the second projection lens and that enters the inter-lens region illumination lens.

19 Claims, 7 Drawing Sheets

(56) References Cited

U.S. PATENT DOCUMENTS

| | | | |
|---|---|---|---|
| 2008/0043485 | A1 | 2/2008 | Koerner et al. |
| 2008/0239744 | A1 | 10/2008 | Nakada et al. |
| 2010/0202152 | A1* | 8/2010 | Nakada ............... F21S 48/1159 362/517 |
| 2011/0199776 | A1 | 8/2011 | Takahashi et al. |

FOREIGN PATENT DOCUMENTS

| | | |
|---|---|---|
| EP | 1965126 A1 | 9/2008 |
| JE | 2008-071751 A | 3/2008 |
| JP | H03-094702 U | 9/1991 |
| JP | 2007-109493 A | 4/2007 |
| JP | 2008-243477 A | 10/2008 |
| JP | 2008277130 A | 11/2008 |
| JP | 2010033932 A | 2/2010 |
| JP | 2010073426 A | 4/2010 |
| JP | 2011-086580 A | 4/2011 |
| JP | 2011-159584 A | 8/2011 |
| JP | 2011-171044 A | 9/2011 |
| JP | 2013-054831 A | 3/2013 |

OTHER PUBLICATIONS

The Written Opinion of the International Searching Authority (From PCT/ISA/237) issued on May 13, 2014, by the Japanese Patent Office in corresponding International Application No. PCT/JP2014/001495, with English Translation. (9 pages).

International Preliminary Report on Patentability (Form PCT/IPEA/409) issued on Jun. 2, 2015, by the Japanese Patent Office in corresponding International Application No. PCT/JP2014/001495, with English Translation. (11 pages).

Office Action (Notification of Reason(s) for Refusal) issued on Feb. 10, 2015, by the Japanese Patent Office in corresponding Japanese Patent Application No. 2013-060931, and an English Translation of the Office Action. (8 pages).

Office Action (Notification of Reason(s) for Refusal) issued on May 12, 2015, by the Japanese Patent Office in corresponding Japanese Patent Application No. 2013-060931, and an English Translation of the Office Action. (5 pages).

International Search Report (PCT/ISA/210) mailed on May 13, 2014, by the Japanese Patent Office as the International Searching Authority for International Application No. PCT/JP2014/001495.

Extended European Search Report dated Oct. 10, 2016 issued in corresponding European Patent Appln. No. 14768109.2 (8 pages).

Chinese Office Action dated Oct. 31, 2016 issued in corresponding Chinese Patent Appln. No. 201480016361.3 (14 pages).

* cited by examiner

AUTOMOTIVE LAMP

BACKGROUND OF THE INVENTION

1. Field of the Invention

The present invention relates to an automotive lamp and, more particularly, to an automotive lamp used in a vehicle such as an automobile.

2. Description of the Related Art

Patent document No. 1 discloses an automotive lamp that forms a low beam light distribution pattern, using a plurality of lamp units. More specifically, a first unit for forming a low beam light distribution pattern (the light distribution pattern of a low beam) has three subunits. Each of the subunits forms any one of a pattern for forming a hot zone, a pattern for forming a cutoff line that is larger than the pattern for forming a hot zone, a pattern for forming a diffusion area that extends more in a transverse direction than the pattern for forming a cutoff line, and the three patterns are superimposed on one another to form a low beam light distribution pattern. Each of the subunits is provided with a projection lens having a substantially perfect circle shape when viewed from the front.

[Patent document No. 1] Japanese Patent Application Publication No. 2008-243477

In the case of forming one light distribution pattern by using a plurality of lamp units, light-emitting regions of the respective lamp units are desirably connected so as to be viewed as one light-emitting unit as a whole in an automotive lamp. This is for the purpose of improving a function of the automotive lamp that allows a pedestrian or the like to recognize the presence of the own vehicle by increasing the area of one light-emitting unit (this function is hereinafter referred to as an own-vehicle-marking function).

SUMMARY OF THE INVENTION

In this background, a purpose of the present invention is to provide a technology for allowing a plurality of lamp units to be easily viewed as one light-emitting unit.

An embodiment of the present invention relates to an automotive lamp. The automotive lamp includes: a first lamp unit that has a first projection lens; a second lamp unit that has a second projection lens; and an inter-lens region illumination lens that is arranged such that the inter-lens region illumination lens covers a region between the first projection lens and the second projection lens when viewed from the front of the lamp and such that the inter-lens region illumination lens radiates, toward the front of the lamp, light that is emitted from at least one of the first projection lens and the second projection lens and that enters the inter-lens region illumination lens.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE INVENTION

Figure 1:
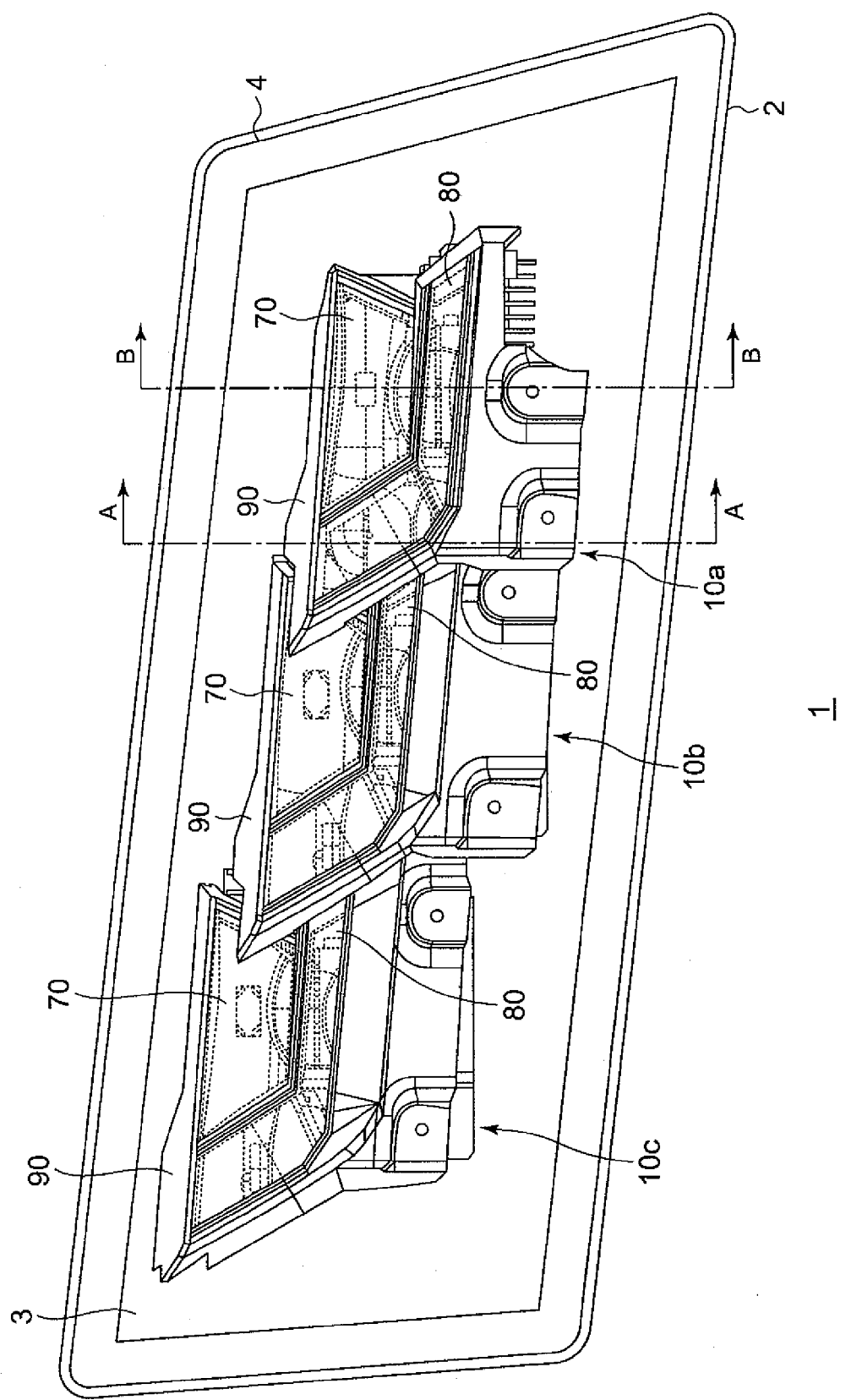
FIG. 1 is a front view illustrating a schematic structure of an automotive lamp according to an embodiment.

An embodiment of the present invention relates to an automotive lamp. The automotive lamp includes: a first lamp unit that has a first projection lens; a second lamp unit that has a second projection lens; and an inter-lens region illumination lens that is arranged such that the inter-lens region illumination lens covers a region between the first projection lens and the second projection lens when viewed from the front of the lamp and such that the inter-lens region illumination lens radiates, toward the front of the lamp, light that is emitted from at least one of the first projection lens and the second projection lens and that enters the inter-lens region illumination lens.

According to this embodiment, a plurality of lamp units can be easily viewed as one light-emitting unit.

In the above embodiment, the inter-lens region illumination lens may cover the first projection lens and the second projection lens when viewed from the front of the lamp. Thereby, a sense of unity between the first lamp unit and the second lamp unit can be further increased. The first lamp unit and the second lamp unit may form a low beam distribution pattern. Thereby, the plurality of lamp units for forming a low beam light distribution pattern can be easily viewed as one light-emitting unit.

In any one of the above embodiments, the vertical length of the first projection lens may be longer than the horizontal length thereof when viewed from the front of the lamp, and the horizontal length of the second projection lens may be longer than the vertical length thereof when viewed from the front of the lamp. Thereby, a dead space that is difficult to be used for the installation of another lamp unit or the like can be reduced compared to a case where a plurality of lamp units are arranged that have a substantially perfect circle shape when viewed from the front of the lamp. Also, the vertical length of the first projection lens may be longer than the vertical length of the second projection lens when viewed from the front of the lamp, and the horizontal length of the second projection lens may be longer than the horizontal length of the first projection lens when viewed from the front of the lamp. According to this, the degree of freedom in the arrangement of lamp units can be increased.

In any one of the above embodiments, the first lamp unit may form a first pattern that constitutes a portion of the low beam light distribution pattern, and the second lamp unit may form a second pattern that constitutes the other portion of the low beam light distribution pattern and that has a shape more diffused in a substantially horizontal direction than the first pattern. According to this, the utilization efficiency of light from a light source in each lamp unit can be increased. Also, the first lamp unit and the second lamp unit may be arranged such that the first projection lens and the second projection lens form a substantially L shape. This allows for a further reduction in a dead space.

In any one of the above embodiments, the automotive lamp may further includes: a third lamp unit that is arranged such that the third lamp unit lines up horizontally with the first lamp unit and lines up vertically with the second lamp unit when viewed from the front of the lamp. This allows for the miniaturization of the automotive lamp. At least one of the first projection lens and the second projection lens may have a flange portion that extends from the peripheral edge thereof. This allows a fixation structure of the first projection lens and/or the second projection lens to be simplified.

A description will be given of an embodiment of the present invention with reference to the drawings. The same or equivalent constituting elements, members, and processes illustrated in each drawing shall be denoted by the same reference numerals, and duplicative explanations will be omitted appropriately. Reference herein to details of the illustrated embodiments is not intended to limit the scope of the claims. It should be understood that not all of the features and the combination thereof discussed are essential to the invention.

Figure 2:
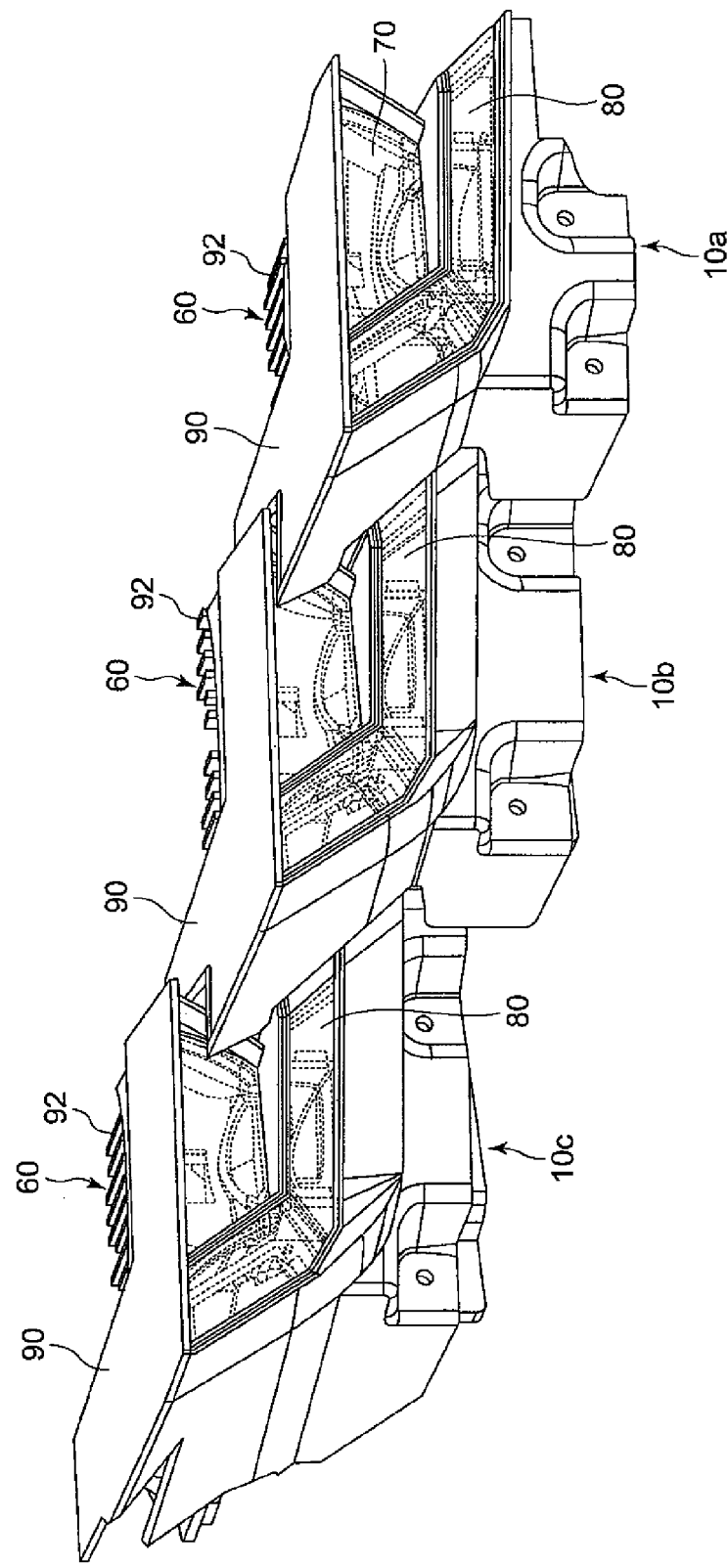
FIG. 2 is a perspective view illustrating a schematic structure of a plurality of headlamp subunits in the automotive lamp according to the embodiment.
Figure 3:
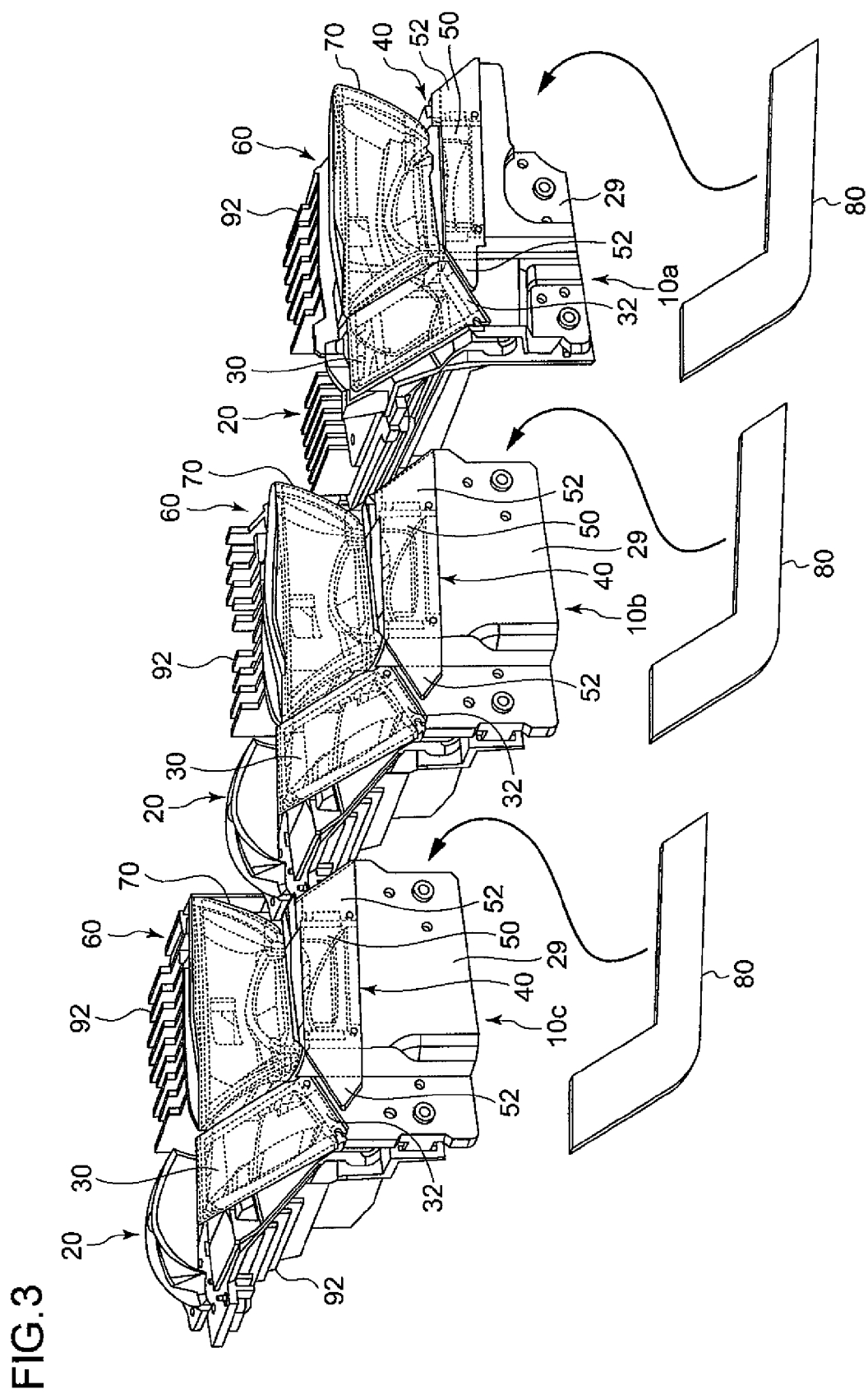
FIG. 3 is a perspective view illustrating a schematic structure of a state where extension members and third lenses are removed from the headlamp subunits.
Figure 4:
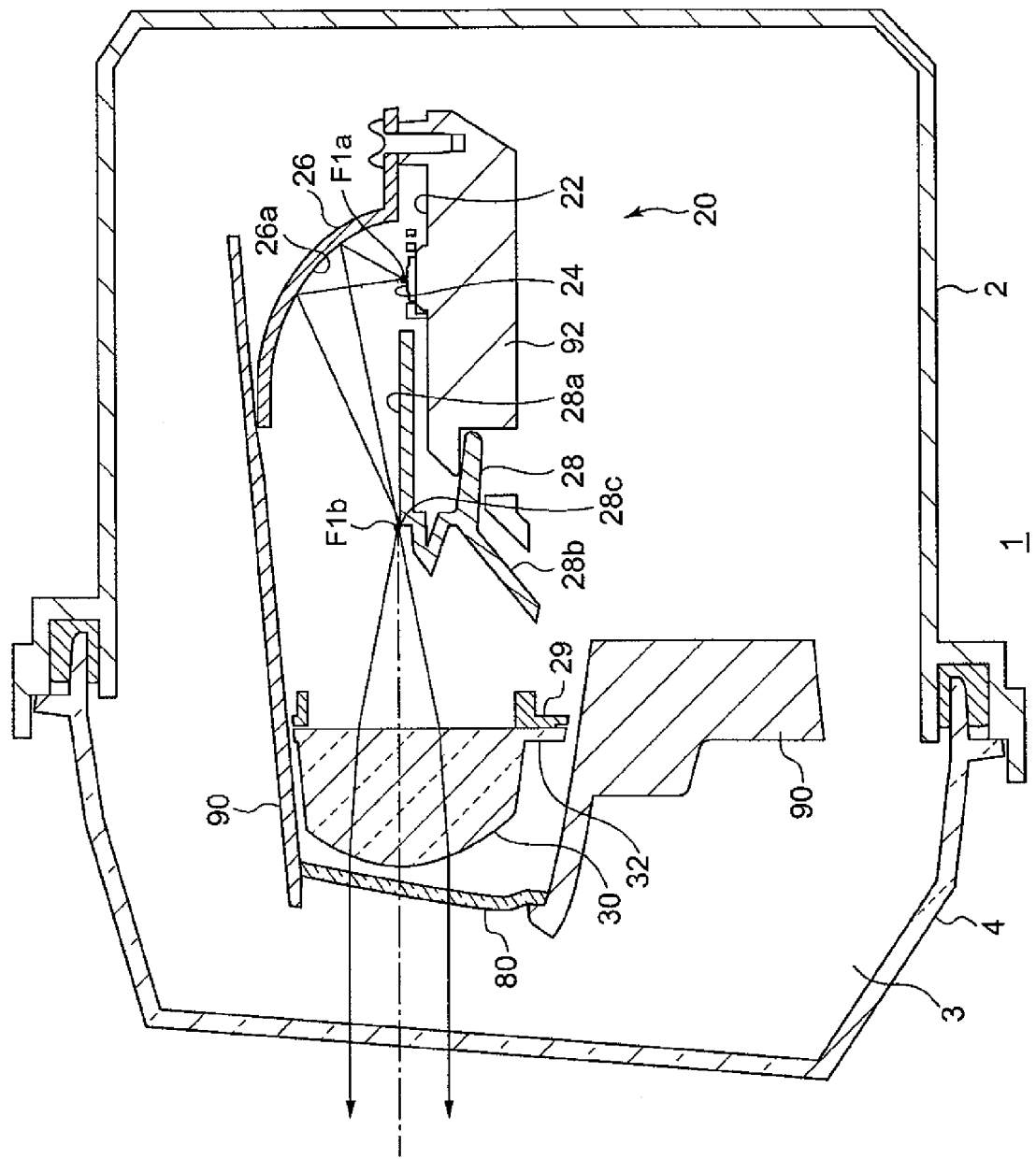
FIG. 4 is a cross sectional view along line A-A of FIG. 1.
Figure 5:
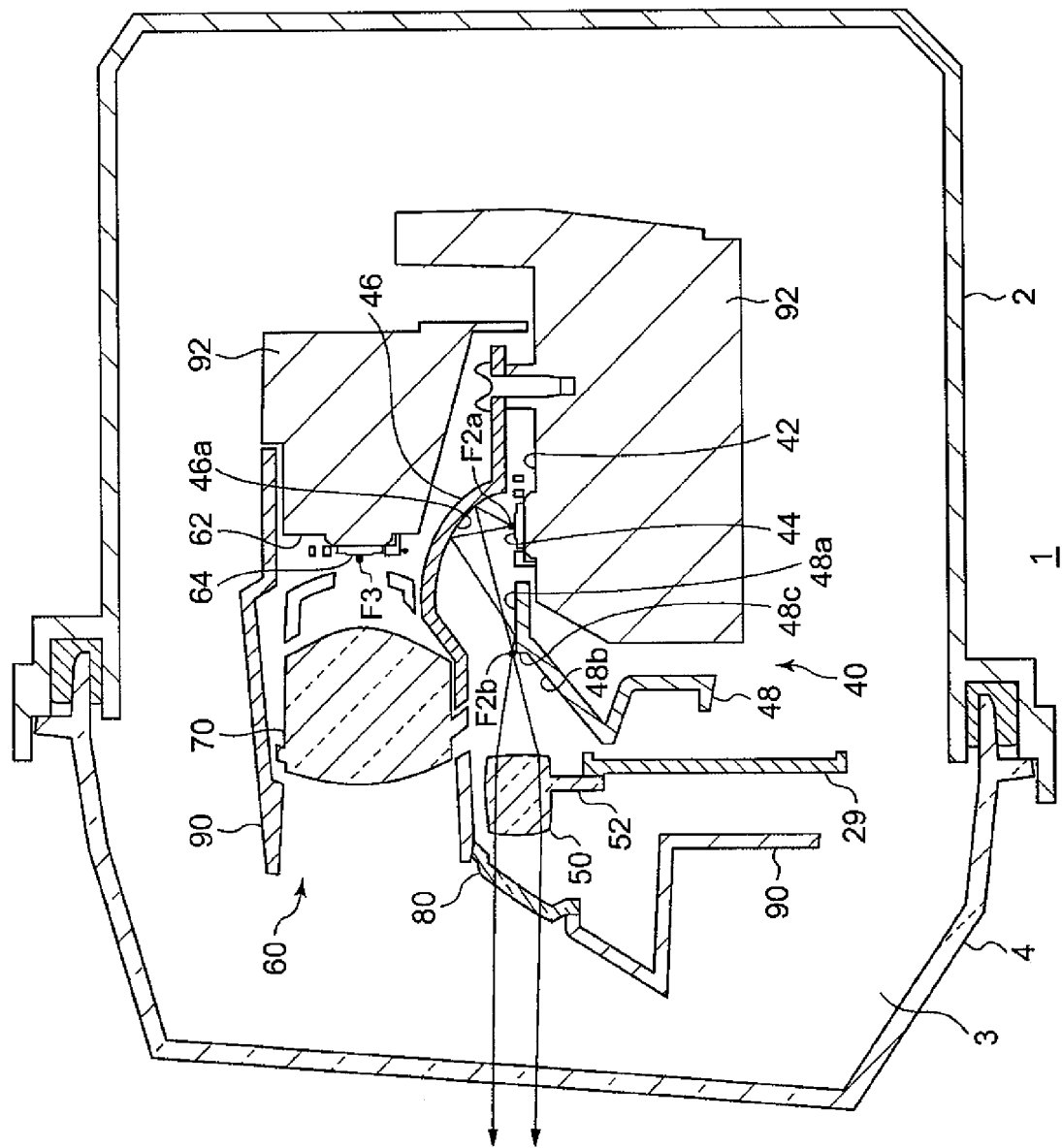
FIG. 5 is a cross sectional view along line B-B of FIG. 1.

FIG. 1 is a front view illustrating a schematic structure of an automotive lamp according to an embodiment. FIG. 2 is a perspective view illustrating a schematic structure of a plurality of headlamp subunits in the automotive lamp according to the embodiment. FIG. 3 is a perspective view illustrating a schematic structure of a state where extension members and third lenses are removed from the headlamp subunits. FIG. 4 is a cross sectional view along line A-A of FIG. 1. FIG. 5 is a cross sectional view along line B-B of FIG. 1. The illustration of a lamp body 2 and a translucent cover 4 is omitted in FIG. 2, and the illustration of a lamp body 2, a translucent cover 4, and an extension member 90 is omitted in FIG. 3. An automotive lamp 1 according to the present embodiment is an automotive headlamp apparatus that has a pair of headlamp units disposed on the left and right of the front of a vehicle. The pair of headlamp units have substantially the same structure other than having structures that are bilaterally symmetrical. Thus, the structure of one of the headlamp units is shown as the automotive lamp 1 in FIG. 1.

As shown in FIGS. 1-5, the automotive lamp 1 is provided with a lamp body 2 that has an opening on a frontward side of the vehicle and a translucent cover 4 that is attached to cover the opening of the lamp body 2. The translucent cover 4 is formed of a resin, glass, or the like that is translucent. The translucent cover 4 has a substantially uniform thickness and is not provided with an optical function such as diffusion or refraction of light radiated from each lamp unit described later. Thus, the translucent cover 4 does not contribute to the formation of a light distribution pattern. Three headlamp subunits 10a, 10b, and 10c are accommodated in a lamp chamber 3 formed by the lamp body 2 and the translucent cover 4. The headlamp subunits 10a through 10c each have a first lamp unit 20, a second lamp unit 40, and a third lamp unit 60. The headlamp subunits 10a through 10c each have an inter-lens region illumination lens 80 and an extension member 90.

The respective structures of a first lamp unit 20 through a third lamp unit 60 provided in each of the headlamp subunits 10a through 10c are substantially consistent except for slight differences in the shape or the like of a reflective surface of a reflector or a projection lens caused due to differences in the shape of a light distribution pattern to be formed. The respective shapes of an inter-lens region illumination lens 80 and an extension member 90 are also substantially consistent. Therefore, a detailed explanation will be given in the following regarding the respective structures of each unit using a first lamp unit 20 through a third lamp unit 60, an inter-lens region illumination lens 80, and an extension member 90 provided in the headlamp subunit 10a as examples.

In the lamp chamber 3, the first lamp unit 20, the second lamp unit 40, and the third lamp unit 60 are each supported by a bracket (not shown). An aiming screw (not shown) that is rotatably supported by a wall surface of the lamp body 2 and a leveling shaft (not shown) that penetrates through the wall surface of the lamp body 2 and extends toward the front of the lamp are connected to the bracket. The leveling shaft is connected to a leveling actuator (not shown). In the automotive lamp 1, the respective optical axes of the first lamp unit 20 through the third lamp unit 60 are adjustable in the vertical and the horizontal directions using the aiming screw, the leveling shaft, and the leveling actuator. The supporting structure of the first lamp unit 20 through the third lamp unit 60 is not particularly limited to this.

The extension member 90 has an opening in a region where a first projection lens 30 of the first lamp unit 20, a second projection lens 50 of the second lamp unit 40, and a third projection lens 70 of the third lamp unit 60 exist. The extension member 90 is fixed to a lens holder portion 29 and covers the circumference of the headlamp subunit 10a. In the present embodiment, the respective extension members 90 of the headlamp subunit 10a through the headlamp subunit 10c are formed integrally.

An inter-lens region illumination lens 80 is provided in an opening of the extension member 90 that is located in a region where the first projection lens 30 and the second projection lens 50 exist. The inter-lens region illumination lens 80 is arranged such that the inter-lens region illumination lens 80 covers a region between the first projection lens 30 and the second projection lens 50 when viewed from the front of the lamp. The inter-lens region illumination lens 80 functions as an optical member to which light that is emitted from at least one of the first projection lens 30 and the second projection lens 50 enters and that radiates the light toward the front of the lamp. A detailed description will be given later regarding the arrangement and functions of the inter-lens region illumination lens 80.

The inter-lens region illumination lens 80 and the extension member 90 can be formed, for example, as described in the following. In other words, using a translucent resin material or the like, an integrally molded article is created that includes a portion having the shape of the inter-lens region illumination lens 80 and a portion having the shape of the extension member 90. By performing surface treatment such as vapor-deposition of metal, application of coating, or the like on the surface of a portion that is to become the extension member 90 in the integrally molded article, the inter-lens region illumination lens 80 and the extension member 90 can be formed.

As shown in FIG. 4, the first lamp unit 20 is a reflective-type lamp unit and has a first light source mounting portion 22, a first light source 24, a first reflector 26, a first shade member 28, and a first projection lens 30. The first light source mounting portion 22 projects toward the front of the lamp from a bracket, and the first light source 24 is mounted on the upper surface thereof. A heat radiating fin 92 is provided on the lower surface of the first light source mounting portion 22. In the present embodiment, the first light source mounting portion 22 and the heat radiating fin 92 are formed integrally. The first light source 24 is, for example, a white light-emitting diode (while LED) and has a light emitting device and a substrate that supports this light emitting device. The substrate is a thermally conductive insulating substrate formed of a ceramic or the like. An electrode (not shown) that transmits electric power to the light emitting device is formed in the substrate.

The first reflector 26 has a substantially dome shape and is fixed to the first light source mounting portion 22 such that the first reflector 26 covers the first light source 24. A reflective surface 26a is formed on the inside of the first reflector 26. The reflective surface 26a is constituted by a part of an ellipsoid of revolution and has a focal point F1a and a focal point F1b located further to the front of the lamp than the focal point F1a. The first shade member 28 has a planar part 28a that is disposed substantially horizontally and a bent part 28b that is bent downward at a position further to the front of the lamp than the planar part 28a. The first reflector 26 is arranged such that the focal point F1a of the reflective surface 26a is positioned near the first light source 24 and such that the focal point F1b is positioned near a ridge line 28c formed by the planar part 28a and the bent part 28b of the first shade member 28.

The first projection lens 30 is constituted of a plano-convex lens having a convex front surface and a plane rear surface. The first projection lens 30 projects, as an inverted image, a light source image formed on a rear focal plane including a rear focal point of the first projection lens 30 onto a virtual vertical screen in front of the lamp. The first projection lens 30 is disposed such that the rear focal point overlaps with the focal point F1b and is fixed to the lens holder portion 29. The first projection lens 30 has a flange portion 32 extending from the peripheral edge thereof and is fixed to the lens holder portion 29 through a fixing member, such as a screw or the like, inserted into the flange portion 32. By providing the flange portion 32 for lens fixation on the first projection lens 30, a fixation structure of the first projection lens 30 can be simplified, and the manufacturing costs for the automotive lamp 1 can be reduced.

The first lamp unit 20 is a lamp unit for forming a low beam light distribution pattern. The ridge line 28c of the first shade member 28 has a shape that corresponds to a cutoff line of a light distribution pattern formed by the first lamp unit 20. Light that is radiated from the first light source 24 is reflected toward the focal point F1b by the reflective surface 26a. Then, a portion of the light is selectively cut by the first shade member 28, and the remaining portion enters the first projection lens 30. The light that has entered the first projection lens 30 is radiated toward the front of the lamp and enters the inter-lens region illumination lens 80. A portion of the light that has entered the inter-lens region illumination lens 80 is, for example, internally reflected inside the inter-lens region illumination lens 80 and guided to a region overlapping a gap region R located between the first projection lens 30 and the second projection lens 50 when viewed from the front of the lamp. The light is then radiated toward the front of the lamp from the region (see FIG. 6B). The remaining portion of the light that has entered the inter-lens region illumination lens 80 is transmitted through the inter-lens region illumination lens 80 and radiated toward the front of the lamp, forming a predetermined light distribution pattern.

As shown in FIG. 5, the second lamp unit 40 is a reflective-type lamp unit and has a second light source mounting portion 42, a second light source 44, a second reflector 46, a second shade member 48, and a second projection lens 50. The second light source mounting portion 42 projects toward the front of the lamp from a bracket, and the second light source 44 is mounted on the upper surface thereof. A heat radiating fin 92 is provided on the lower surface of the second light source mounting portion 42. In the present embodiment, the second light source mounting portion 42 and the heat radiating fin 92 are formed integrally. The second light source 44 has the same configuration as that of the first light source 24.

The second reflector 46 has a substantially dome shape and is fixed to the second light source mounting portion 42 such that the second reflector 46 covers the second light source 44. A reflective surface 46a is formed on the inside of the second reflector 46. The reflective surface 46a is constituted by a part of an ellipsoid of revolution and has a focal point F2a and a focal point F2b located further to the front of the lamp than the focal point F2a. The second shade member 48 has a planar part 48a that is disposed substantially horizontally and a bent part 48b that is bent downward at a position further to the front of the lamp than the planar part 48a. The second reflector 46 is arranged such that the focal point F2a of the reflective surface 46a is positioned near the second light source 44 and such that the focal point F2b is positioned near a ridge line 48c formed by the planar part 48a and the bent part 48b of the second shade member 48.

The second projection lens 50 is constituted of a biconvex lens, which has a convex front surface and a convex rear surface. The second projection lens 50 projects, as an inverted image, a light source image formed on a rear focal plane including a rear focal point of the second projection lens 50 onto a virtual vertical screen in front of the lamp. The second projection lens 50 is disposed such that the rear focal point overlaps with the focal point F2b and is fixed to a lens holder portion 29. The second projection lens 50 has a flange portion 52 extending from the peripheral edge thereof and is fixed to the lens holder portion 29 through a fixing member, such as a screw or the like, inserted into the flange portion 52. Thereby, a fixation structure of the second projection lens 50 can be simplified, and the manufacturing costs for the automotive lamp 1 can be reduced.

The second lamp unit 40 is a lamp unit for forming a low beam light distribution pattern. The ridge line 48c of the second shade member 48 has a shape that corresponds to a cutoff line of a light distribution pattern formed by the second lamp unit 40. Light that is radiated from the second light source 44 is reflected toward the focal point F2b by the reflective surface 46a. Then, a portion of the light is selectively cut by the second shade member 48, and the remaining portion enters the second projection lens 50. The light that has entered the second projection lens 50 is radiated toward the front of the lamp and enters the inter-lens region illumination lens 80. A portion of the light that has entered the inter-lens region illumination lens 80 is internally reflected inside the inter-lens region illumination lens 80 and guided to a region overlapping a gap region R located between the first projection lens 30 and the second projection lens 50 when viewed from the front of the lamp. The light is then radiated toward the front of the lamp from the region (see FIG. 6B). The remaining portion of the light that has entered the inter-lens region illumination lens 80 is transmitted through the inter-lens region illumination lens 80 and radiated toward the front of the lamp, forming a predetermined light distribution pattern.

The third lamp unit 60 is a direct-projection type lamp unit and has a third light source mounting portion 62, a third light source 64, and a third projection lens 70. The third light source mounting portion 62 projects toward the front of the lamp from a bracket, and the third light source 64 is mounted on a surface of the third light source mounting portion 62 that is facing the front of the lamp. A heat radiating fin 92 is provided on a surface of the third light source mounting portion 62 that is facing the back of the lamp. In the present embodiment, the third light source mounting portion 62 and the heat radiating fin 92 are formed integrally. The third light source 64 has the same configuration as that of the first light source 24.

The third projection lens 70 is constituted of a biconvex lens, which has a convex front surface and a convex rear surface. The third projection lens 70 projects, as an inverted image, a light source image formed on a rear focal plane including a rear focal point of the third projection lens 70 onto a virtual vertical screen in front of the lamp. The third projection lens 70 is disposed so that a rear focal point F3 is positioned near the third light source 64 and is fixed by an extension member 90. Therefore, the extension member 90 functions as a holder for the third projection lens 70.

The third lamp unit 60 is a lamp unit for forming a high beam light distribution pattern. Light that is radiated from the third light source 64 directly enters the third projection lens 70. The light that has entered the third projection lens 70 is radiated toward the front of the lamp from the third projection lens 70. The third lamp unit 60 may be a lamp unit that forms other distribution patterns.

Figure 6B:
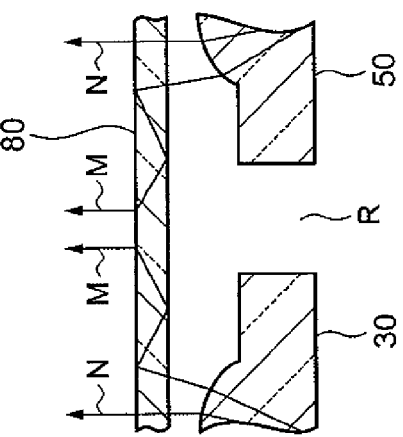
FIG. 6B is a cross sectional view along line C-C of FIG. 6A.
Figure 6A:
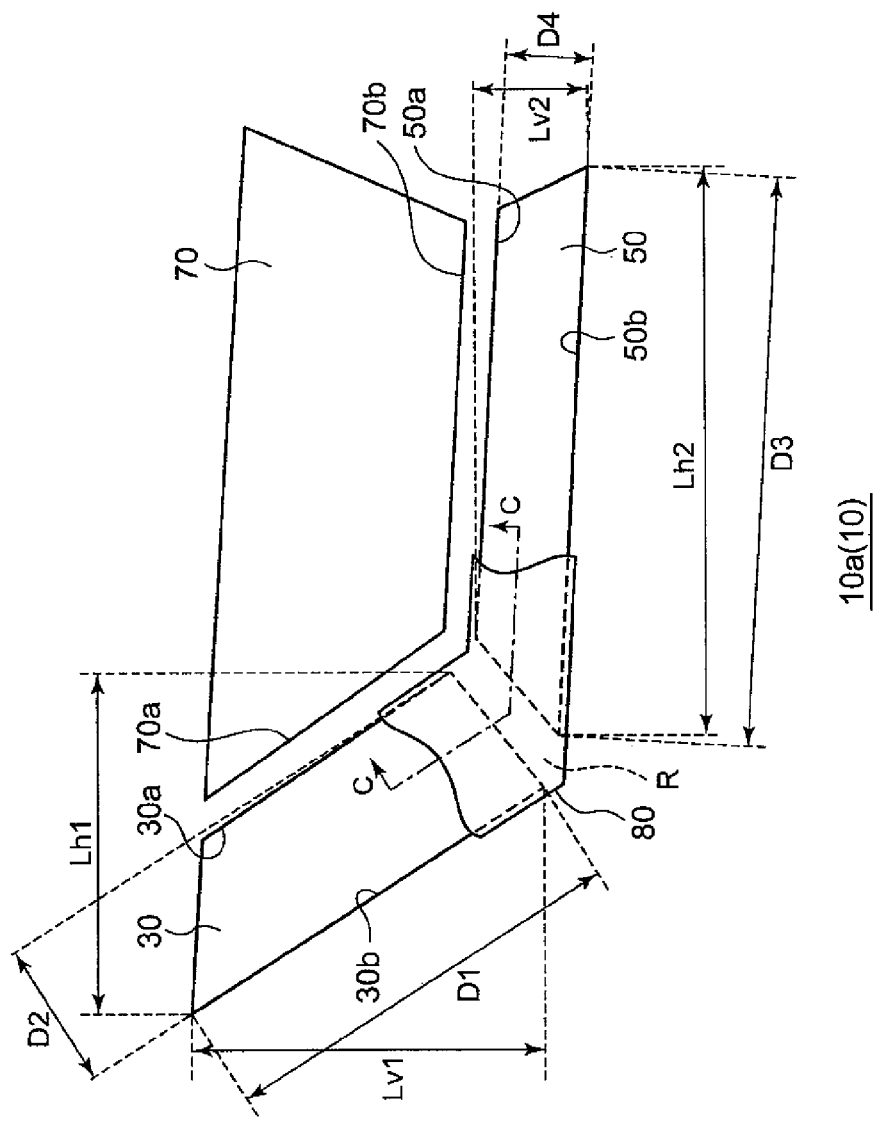
FIG. 6A is a front view schematically illustrating a headlamp subunit of the automotive lamp according to the embodiment.

A detailed description will be given next regarding the respective shapes and arrangements of each projection lens and inter-lens region illumination lens 80. FIG. 6A is a front view schematically illustrating a headlamp subunit of the automotive lamp according to the embodiment. FIG. 6B is a cross sectional view along line C-C of FIG. 6A. As described above, since the respective structures of the headlamp subunits 10a through 10c are substantially the same, an explanation will be given regarding the respective shapes and arrangements of each projection lens and inter-lens region illumination lens 80 using the headlamp subunit 10a as an example in the following.

The first projection lens 30 of the first lamp unit 20 has a substantially square shape when viewed from the front of the lamp, and a vertical length Lv1, i.e., a height dimension, is larger than a horizontal length Lh1, i.e., a width dimension (Lv1>Lh1). The second projection lens 50 of the second lamp unit 40 has a substantially square shape when viewed from the front of the lamp, and a horizontal length Lh2 is larger than a vertical length Lv2 (Lh2>Lv2). The first lamp unit 20 and the second lamp unit 40 are arranged such that one end of the first projection lens 30 and one end of the second projection lens 50 become adjacent to each other.

Also, with regard to a dimension D1 in a first direction and a dimension D2 in a second direction that is orthogonal to the first direction, the first projection lens 30 has an elongated shape where the dimension D1 in the first direction is larger than the dimension D2 in the second direction. In the same way, with regard to a dimension D3 in a third direction and a dimension D4 in a fourth direction that is orthogonal to the third direction, the second projection lens 50 has an elongated shape where the dimension D3 in the third direction is larger than the dimension D4 in the fourth direction. The first projection lens 30 and the second projection lens 50 are oriented such that the first direction and the third direction intersect with each other and arranged such that one end of the first projection lens 30 and one end of the second projection lens 50 become adjacent to each other. For example, the first direction is a direction that is parallel to the longest side 30b in the first projection lens 30, and the third direction is a direction that is parallel to the longest side 50b in the second projection lens 50.

With the first projection lens 30 having a vertically long shape and the second projection lens 50 having a horizontally long shape while one end of the first projection lens 30 and one end of the second projection lens 50 are being adjacent to each other, as described above, a dead space that is difficult to be used for the installation of another lamp unit or the like can be reduced compared to a case where a plurality of lamp units having a substantially perfect circle shape when viewed from the front of the lamp are arranged. Therefore, a space can be created inside a lamp chamber 3 that allows for an increase in size of lamp units and the installation of a plurality of lamp units. Thus, both an increase in the size of lamp units and the number of lamp units to be mounted and the miniaturization of the automotive lamp can be achieved. Also, the degree of freedom in the arrangement of lamp units can be increased. Further, the automotive lamp 1 is able to have novel appearance, and the design of the automotive lamp 1 can thus be improved.

A gap region R exists between one end of the first projection lens 30 and one end of the second projection lens 50 that are adjacent to each other. The inter-lens region illumination lens 80 is arranged such that the inter-lens region illumination lens 80 covers this gap region R when viewed from the front of the lamp. A portion of light emitted from the first projection lens 30 or the second projection lens 50 enters the inter-lens region illumination lens 80, and the inter-lens region illumination lens 80 radiates the light toward the front of the lamp. In other words, the inter-lens region illumination lens 80 guides a portion of light (indicated by an arrow M in FIG. 6B) emitted from the first projection lens 30 or the second projection lens 50 to a region that covers the gap region R by internal reflection, diffusion, and refraction and radiates the light toward the front of the lamp from the region.

Thereby, the automotive lamp 1 allows the gap region R between the first projection lens 30 and the second projection lens 50 to be luminous when viewed from the outside of the lamp. Therefore, the two lamp units for forming a low beam light distribution pattern can be easily viewed as one continuous light-emitting unit. The above-described optical function of the inter-lens region illumination lens 80 can be achieved by, for example, a partial change in the thickness of the inter-lens region illumination lens 80, a diffusion step provided on a surface thereof, surface treatment such as surface texturing, or the like. A configuration may be employed where only one of light emitted from the first projection lens 30 and light emitted from the second projection lens 50 is guided to the region of the inter-lens region illumination lens 80 that overlaps the gap region R and then emitted through this region.

In the present embodiment, the inter-lens region illumination lens 80 covers the entirety of the first projection lens 30 and the second projection lens 50 when viewed from the front of the lamp. Thereby, a sense of unity between the first lamp unit 20 and the second lamp unit 40 can be further increased. The inter-lens region illumination lens 80 has a shape that is the same as or similar to a shape formed by the first projection lens 30 and the second projection lens 50 that are connected to each other when viewed from the front of the lamp. In the present embodiment, since the first projection lens 30 and the second projection lens 50 are arranged such that the first projection lens 30 and the second projection lens 50 form a substantially L shape, the inter-lens region illumination lens 80 has a substantially L shape.

The vertical length Lv1 of the first projection lens 30 is longer than the vertical length Lv2 of the second projection lens 50 (Lv1>Lv2). The horizontal length Lh2 of the second projection lens 50 is longer than the horizontal length Lh1 of the first projection lens 30 (Lh2>Lh1). Thereby, the degree of freedom in the installation of lamp units can be increased.

Also, this can contribute to a reduction in a dead space. Further, the first lamp unit 20 and the second lamp unit 40 are arranged such that the first projection lens 30 and the second projection lens 50 form a substantially L shape. This allows for a further reduction in a dead space. Also, this can contribute to an increase in the degree of freedom in the arrangement of lamp units.

The third lamp unit 60 is arranged such that the third lamp unit 60 lines up horizontally with the first lamp unit 20 and lines up vertically with the second lamp unit 40 when viewed from the front of the lamp. In other words, the third lamp unit 60 is arranged in a space located further to the side in the extending direction of the second projection lens 50 than the first projection lens 30 and located further to the side in the extending direction of the first projection lens 30 than the second projection lens 50. By arranging the third lamp unit such that at least a portion of the third lamp unit 60 is housed in a space surrounded by the first projection lens 30 and the second projection lens 50 in this manner, the headlamp subunits 10a through 10c can be miniaturized, and the automotive lamp 1 can thus be miniaturized eventually.

The third projection lens 70 of the third lamp unit 60 has a substantially square shape. A first side 70a adjacent to the first projection lens 30 extends parallel to a side 30a of the first projection lens 30 that is adjacent to the third lamp unit 60, and a second side 70b adjacent to the second projection lens 50 extends parallel to a side 50a of the second projection lens 50 that is adjacent to the third lamp unit 60. Thereby, a sense of unity among the first lamp unit 20 through the third lamp unit 60 can be increased. Further, the automotive lamp 1 is able to have a novel design.

Figure 7A:
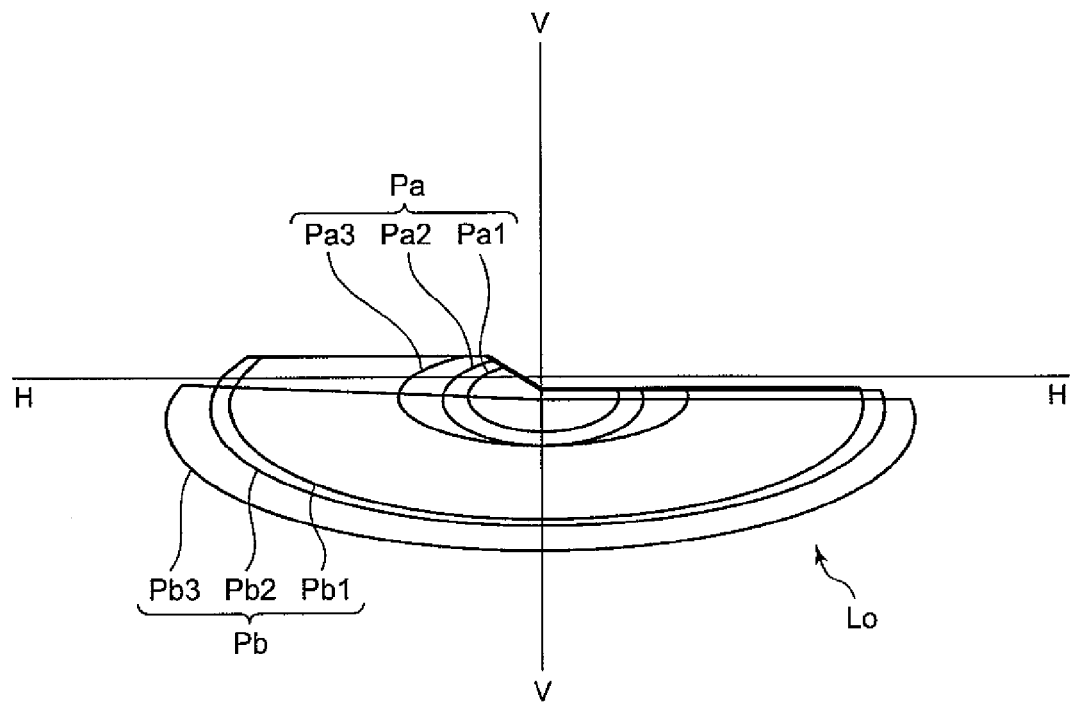
FIG. 7A is a schematic diagram for explaining a light distribution pattern formed by a first lamp unit and a second lamp unit.
Figure 7B:
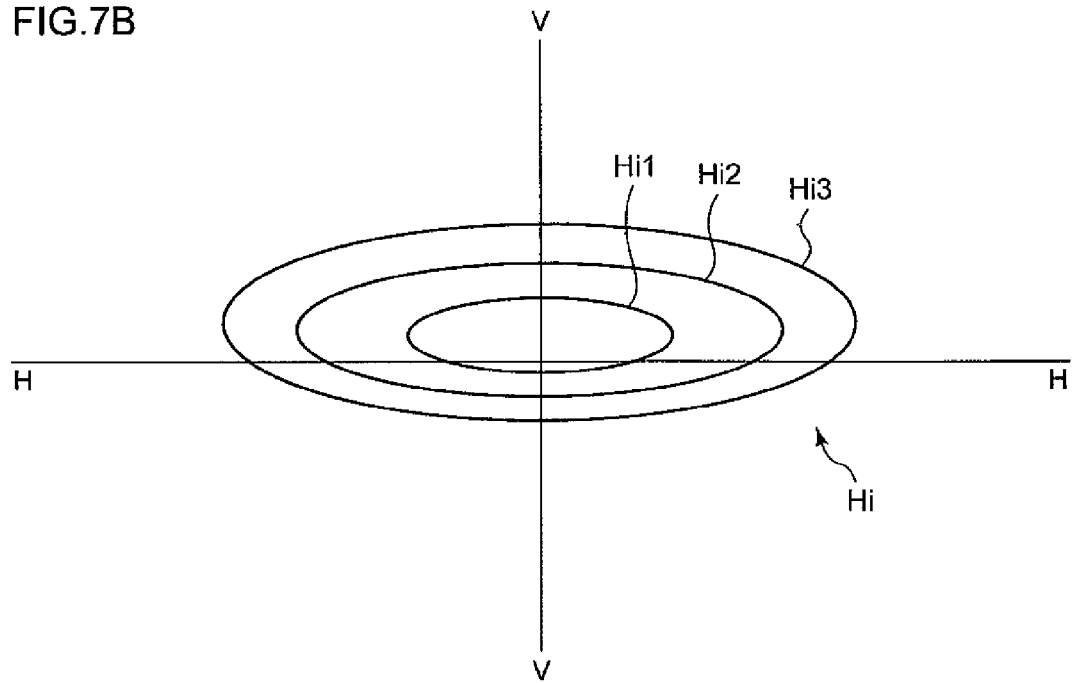
FIG. 7B is a schematic diagram for explaining a light distribution pattern formed by a third lamp unit.

A description will be given next regarding a light distribution pattern formed by the automotive lamp 1. FIG. 7A is a schematic diagram for explaining a light distribution pattern formed by a first lamp unit and a second lamp unit. FIG. 7B is a schematic diagram for explaining a light distribution pattern formed by a third lamp unit. FIGS. 7A and 7B show a light distribution pattern formed on a virtual vertical screen placed at a predetermined position in front of the lamp, for example, at a position that is 25 meters ahead of the lamp.

As shown in FIG. 7A, the first lamp unit 20 forms a first pattern Pa that constitutes a portion of a low beam light distribution pattern Lo. The second lamp unit 40 forms a second pattern Pb that constitutes the other portion of the low beam light distribution pattern Lo. The first pattern Pa has a shape where light is more condensed than the second pattern Pb, and the second pattern Pb has a shape where light is more diffused in the substantially horizontal direction than the first pattern Pa. In the present embodiment, the second pattern Pb has a shape where the second pattern Pb is also more diffused in the substantially vertical direction than the first pattern Pa. The first pattern Pa is superimposed on a central area of the second pattern Pb so as to form the low beam light distribution pattern Lo. The shape of the low beam light distribution pattern Lo is publicly known. Thus, a detailed description thereof is omitted.

The automotive lamp 1 forms a light-condensing pattern by the first lamp unit 20 having the vertically long first projection lens 30 and forms a diffusion pattern that extends in the substantially horizontal direction by the second lamp unit 40 having the horizontally long second projection lens 50. In other words, since a light distribution pattern having a shape that is suitable for the shape of each projection lens is formed, the utilization efficiency of light that is radiated from each light source can be increased.

In the present embodiment, a first pattern Pa1 is formed by a first lamp unit 20 of a headlamp subunit 10a, a first pattern Pa2 that is more diffused than the first pattern Pa1 is formed by a first lamp unit 20 of a headlamp subunit 10b, and a first pattern Pa3 that is more diffused than the first pattern Pa2 is formed by a first lamp unit 20 of a headlamp subunit 10c. A second pattern Pb1 is formed by a second lamp unit 40 of the headlamp subunit 10a, a second pattern Pb2 that is more diffused than the second pattern Pb1 is formed by a second lamp unit 40 of the headlamp subunit 10b, and a second pattern Pb3 that is more diffused than the second pattern Pb2 is formed by a second lamp unit 40 of the headlamp subunit 10c. Therefore, in the present embodiment, the low beam light distribution pattern Lo is formed by synthesis of the six different light distribution patterns. Differences in shape that lie in the first patterns and differences in shape that lie in the second patterns can be achieved by adjusting the respective shapes of the reflective surfaces 26a and 46a, the ridge lines 28c and 48c, the first projection lens 30, the second projection lens 50, and the like. Since a method used therefor is publicly known, a detailed description thereof is omitted.

As shown in FIG. 7B, the third lamp unit 60 forms a high beam light distribution pattern Hi. The high beam light distribution pattern Hi is formed additionally to the low beam light distribution pattern Lo. The shape of the high beam light distribution pattern Hi is publicly known. Thus, a detailed description thereof is omitted. In the present embodiment, a first high beam light distribution pattern Hi1 is formed by a third lamp unit 60 of the headlamp subunit 10a, a second high beam light distribution pattern Hi2 that is more diffused than the first high beam light distribution pattern Hi1 is formed by a third lamp unit 60 of the headlamp subunit 10b, and a third high beam light distribution pattern Hi3 that is more diffused than the second high beam light distribution pattern Hi2 is formed by a third lamp unit 60 of the headlamp subunit 10c. Therefore, in the present embodiment, the high beam light distribution pattern Hi is formed by synthesis of the three different light distribution patterns. Differences in shape that lie in the first high beam light distribution pattern Hi1 through the third high beam light distribution pattern Hi3 can be achieved by adjusting the shape of the third projection lens 70 and the like. Since a method used therefor is publicly known, a detailed description thereof is omitted.

As described, by changing light distribution patterns formed by a first lamp unit 20 through a third lamp unit 60 of each of the plurality of headlamp subunits 10a through 10c, the degree of freedom in the shape and the illuminance distribution of a light distribution pattern that can be formed by the automotive lamp 1 can be improved. The respective first lamp units 20 of the headlamp units may form light distribution patterns that have the same shape. The same applies to the second lamp units 40 and the third lamp units 60.

As explained above, the automotive lamp 1 according to the present embodiment is provided with the inter-lens region illumination lens 80 that is arranged such that the inter-lens region illumination lens 80 covers the gap region R between the first projection lens 30 and the second projection lens 50 when viewed from the front of the lamp and such that the inter-lens region illumination lens 80 radiates, toward the front of the lamp, light that is emitted from at least one of the first projection lens 30 and the second projection lens 50 and that enters the inter-lens region illumination lens 80. Thereby, the automotive lamp 1 allows the gap region R between the first projection lens 30 and the second projection lens 50 to be luminous when viewed from the outside of the lamp. Therefore, the two lamp units can be easily viewed as one continuous light-emitting unit.

As a result, the area of one light-emitting unit can become larger compared to a case where the two lamp units are viewed as separate light-emitting units. Therefore, the own-vehicle-marking function of the automotive lamp 1 can be improved. Further, a sense of unity among a plurality of lamp units can be increased, and the automotive lamp 1 is able to have a novel design. Also, the possibility that the emission of light from some lamp units is erroneously recognized as a turn signal or the like can be further reduced. Further, a sense of discomfort can be suppressed that is provided to others due to deterioration in the appearance of the automotive lamp caused due to a boundary between light-emitting regions becoming a dark spot.

Also, since the use of the inter-lens region illumination lens 80 allows the gap region R to be luminous, the narrowness of the gap range R that is required in order to allow the first lamp unit 20 and the second lamp unit 40 to look like an integrated light-emitting unit can be mitigated. Therefore, the degree of freedom in the arrangement of lamp units can be increased. The first lamp units 20 through the third lamp units 60 are so-called projector optical systems. Therefore, the light utilization rate can be increased compared to a so-called parabola optical system. Thereby, the first lamp units 20 through the third lamp units 60 are likely to have an elongated shape when viewed from the front of the lamp.

The invention is not limited to the above-mentioned embodiments, and various modifications, such as a design change, may be added thereto on the basis of knowledge of those skilled in the art. It should be understood that any embodiment to which one or more of the modifications are added is also included in the scope of the invention. New embodiments resulting from the addition of modifications to the aforementioned embodiments will provide the advantages of the embodiments and modifications combined.

The first light source 24, the second light source 44, and the third light source 64 may be light sources other than LED's such as incandescent lamps, electric-discharge lamps, or the like. The automotive lamp 1 has three headlamp subunits 10a through 10c. However, the number of headlamp subunits is not particularly limited. One or two headlamp subunits may be provided. Alternatively, four or more headlamp subunits may be provided. The three headlamp subunits 10a through 10c are arranged in the substantially horizontal direction. However, the arrangement is not particularly limited. For example, the three headlamp subunits 10a through 10c may be arranged in line in the substantially vertical direction or diagonally or may be arranged such that the headlamp subunits 10a through 10c overlap with respective vertex positions of an arbitrary polygon. The first lamp units 20 and the second lamp units 40 may be direct-projection type lamp units. The third lamp units 60 may be reflective-type lamp units.

The invention claimed is:

1. An automotive lamp comprising:
   a first lamp unit that has a first projection lens;
   a second lamp unit that has a second projection lens; and
   an inter-lens region illumination lens that is arranged such that the inter-lens region illumination lens covers a region between the first projection lens and the second projection lens when viewed from the front of the lamp and such that the inter-lens region illumination lens radiates, toward the front of the lamp, light that is emitted from at least one of the first projection lens and the second projection lens and that enters the inter-lens region illumination lens,
   wherein, when viewed from the front of the lamp, the inter-lens region illumination lens covers the first projection lens and the second projection lens and has a shape that is the same as or similar to a shape formed by the first projection lens and the second projection lens that are connected to each other.

2. The automotive lamp according to claim 1,
   wherein the first lamp unit and the second lamp unit form a low beam distribution pattern.

3. The automotive lamp according to claim 2,
   wherein the vertical length of the first projection lens is longer than the horizontal length thereof when viewed from the front of the lamp, and
   wherein the horizontal length of the second projection lens is longer than the vertical length thereof when viewed from the front of the lamp.

4. The automotive lamp according to claim 3,
   wherein the vertical length of the first projection lens is longer than the vertical length of the second projection lens when viewed from the front of the lamp, and
   wherein the horizontal length of the second projection lens is longer than the horizontal length of the first projection lens when viewed from the front of the lamp.

5. The automotive lamp according to claim 4,
   wherein the first lamp unit forms a first pattern that constitutes a portion of a low beam light distribution pattern, and
   wherein the second lamp unit forms a second pattern that constitutes the other portion of the low beam light distribution pattern and that has a shape more diffused in a substantially horizontal direction than the first pattern.

6. The automotive lamp according to claim 3,
   wherein the first lamp unit forms a first pattern that constitutes a portion of a low beam light distribution pattern, and
   wherein the second lamp unit forms a second pattern that constitutes the other portion of the low beam light distribution pattern and that has a shape more diffused in a substantially horizontal direction than the first pattern.

7. The automotive lamp according to claim 2,
   wherein the vertical length of the first projection lens is longer than the vertical length of the second projection lens when viewed from the front of the lamp, and
   wherein the horizontal length of the second projection lens is longer than the horizontal length of the first projection lens when viewed from the front of the lamp.

8. The automotive lamp according to claim 7,
   wherein the first lamp unit forms a first pattern that constitutes a portion of a low beam light distribution pattern, and
   wherein the second lamp unit forms a second pattern that constitutes the other portion of the low beam light distribution pattern and that has a shape more diffused in a substantially horizontal direction than the first pattern.

9. The automotive lamp according to claim 1,
   wherein the vertical length of the first projection lens is longer than the horizontal length thereof when viewed from the front of the lamp, and
   wherein the horizontal length of the second projection lens is longer than the vertical length thereof when viewed from the front of the lamp.

10. The automotive lamp according to claim 9,
wherein the first lamp unit forms a first pattern that constitutes a portion of a low beam light distribution pattern, and
wherein the second lamp unit forms a second pattern that constitutes the other portion of the low beam light distribution pattern and that has a shape more diffused in a substantially horizontal direction than the first pattern.

11. The automotive lamp according to claim 10,
wherein the first lamp unit and the second lamp unit are arranged such that the first projection lens and the second projection lens form a substantially L shape.

12. The automotive lamp according to claim 9,
wherein the vertical length of the first projection lens is longer than the vertical length of the second projection lens when viewed from the front of the lamp, and
wherein the horizontal length of the second projection lens is longer than the horizontal length of the first projection lens when viewed from the front of the lamp.

13. The automotive lamp according to claim 12,
wherein the first lamp unit forms a first pattern that constitutes a portion of a low beam light distribution pattern, and
wherein the second lamp unit forms a second pattern that constitutes the other portion of the low beam light distribution pattern and that has a shape more diffused in a substantially horizontal direction than the first pattern.

14. The automotive lamp according to claim 1,
wherein the vertical length of the first projection lens is longer than the vertical length of the second projection lens when viewed from the front of the lamp, and
wherein the horizontal length of the second projection lens is longer than the horizontal length of the first projection lens when viewed from the front of the lamp.

15. The automotive lamp according to claim 14,
wherein the first lamp unit and the second lamp unit are arranged such that the first projection lens and the second projection lens form a substantially L shape.

16. The automotive lamp according to claim 15, further comprising:
a third lamp unit that is arranged such that the third lamp unit lines up horizontally with the first lamp unit and lines up vertically with the second lamp unit when viewed from the front of the lamp.

17. The automotive lamp according to claim 14,
wherein the first lamp unit forms a first pattern that constitutes a portion of a low beam light distribution pattern, and
wherein the second lamp unit forms a second pattern that constitutes the other portion of the low beam light distribution pattern and that has a shape more diffused in a substantially horizontal direction than the first pattern.

18. The automotive lamp according to claim 1,
wherein at least one of the first projection lens and the second projection lens has a flange portion that extends from a peripheral edge thereof.

19. The automotive lamp according to claim 1,
wherein the inter-lens region illumination lens has a shape where the thickness thereof partially varies, a diffusion step provided on a surface thereof, or a surface on which surface texturing is performed.

* * * * *